Patented June 15, 1948

2,443,566

UNITED STATES PATENT OFFICE 2,443,566

FLAME RESISTANT COMPOSITION COMPRISING POLYVINYL ACETATE, PLASTICIZER, AND ANTIMONY TRIOXIDE FILLER

Robert Loveland, Dunellen, N. J., assignor to Johnson & Johnson, New Brunswick, N. J., a corporation of New Jersey No Drawing. Application October 22, 1942, Serial No. 462,935

1 Claim. (Cl. 260—29.6)

This invention is directed to flexible, weather-proof, flame-resistant coatings, or impregnants, and more particularly to such coating compounds as will not only withstand weathering conditions and be flame resistant when applied to sheetings, but which will also impart added tensile strength to such sheetings and particularly to such materials as unwoven fibrous sheets.

Sheets treated in this manner have found wide use for such purposes as theatre drops, airplane wing coatings where fabric coatings were employed, temporary partitions, decorative covers, wall coverings, screens, and more recently for camouflage sheeting. As will be apparent in such uses, particularly the latter, economy is of prime importance, as is flexibility and resistance to weather conditions and flame.

Many attempts have been made in the past to provide such a coating or impregnant but so far as is known, all prior compounds have proved unsatisfactory in one or more respects, that is, they were either too expensive for commercial use, did not withstand severe weather conditions, were too harsh and stiff, or did not impart sufficient tensile strength to the materials to which they were applied.

In accordance with this invention a satisfactory compound is provided in the form of a water dispersion, rather than a solution, and that is insoluble after drying. More specifically a suitable bond or film-forming material is used which need not be a nonflammable bond but may take the form of a flammable bond such as an acrylic acid derivative, a "Rhoplex" resin, or preferably, and contrary to general belief, a vinyl resin emulsion or dispersion such as polyvinyl acetate emulsion (generally considered to be a fully polymerized emulsion), to which is added a flame-proof plasticizer such as an organic liquid like tricresyl phosphate, the polyvinyl acetate and tricresyl phosphate being emulsified. To this emulsion is added a fire-proof metallic oxide or filler which also acts as a fire-resistant extender, such as antimony trioxide and manganese carbonate. Pigments such as chromium oxide, yellow ochre, and iron oxide may also be added to impart any desired color to the compound and further extend the compound. A mildew-proof fungicide such as that sold under trade name of "Dowicide" #3, a chloro-o-phenyl phenol compound, may also be added where conditions likely to result in mildew are to be encountered. The foregoing compound does not include the use of any volatile solvents and furthermore permits the use of an inexpensive normally flammable resin as a binding material.

A typical formula found to be satisfactory in all of the foregoing respects is as follows:

|  | Dry Weight in Lbs. | Wet Weight in Lbs. |
|---|---|---|
| Polyvinyl acetate emulsion | 10.920 | 19.180 |
| Tricresyl Phosphate | 8.224 | 8.224 |
| Antimony trioxide | 12.240 | 12.240 |
| Manganese carbonate | 4.152 | 4.152 |
| Water |  | 34.424 |
| Chromium oxide | 20.920 | 20.920 |
| Yellow ochre | 2.380 | 2.380 |
| Iron oxide red | 4.000 | 4.000 |
| Dowicide #3 |  | 0.1925 |
| Total | 63.476 | 106.3525 |

Additional fire-proofing and weather characteristics may be imparted by adding 48 grams of a chromate such as ammonium chromate to the above wet weight mixture.

A compound of the above formulation may be applied to woven or unwoven sheets by any of the conventional coating or impregnating methods. It has been found desirable to leave approximately 3.5 ounces dry weight of the above compound per square yard on such fabric sheetings as a 500 grain "Masslinn" sheet, an unwoven carded and bonded sheet or web of cotton. To such a sheet the foregoing compound imparts flame-resisting and weather-proofing properties without materially affecting the flexibility of the sheet and furthermore it also materially increases the tensile strength of the sheet.

The foregoing compound when applied to fabrics not only imparts permanent flame resistance to fibrous and normally flammable materials such as cotton fabrics and/or cotton or other fabric sheetings, but at the same time permits the use of flammable resins as a bond. The compound is flexible, non-soluble in water, and readily adapted to any conventional coating or impregnating equipment, all of which makes the compound economical so as to permit its use in great quantities and in mass production methods.

It will be obvious to those skilled in the art that minor changes in the formulae may be made without departing from the spirit and scope of the invention as defined in the appended claim.

I claim:

A flexible weather-proof flame-resistant coating compound free from volatile solvents comprising a water dispersion of normally flammable polyvinyl acetate binder, a compatible flame-resistant plasticizer of tricresyl phosphate, and a flame-resistant metallic filler of antimony trioxide, said compound being water insoluble after drying.

ROBERT LOVELAND.

REFERENCES CITED

The following references are of record in the file of this patent:

UNITED STATES PATENTS

| Number | Name | Date |
|---|---|---|
| 2,167,278 | Leatherman | July 25, 1939 |
| 2,238,956 | Strother | Apr. 22, 1941 |
| 2,316,323 | Doolittle | Apr. 13, 1943 |